United States Patent
Butterfield

(10) Patent No.: US 7,318,004 B2
(45) Date of Patent: Jan. 8, 2008

(54) TEMPERATURE PREDICTION SYSTEM AND METHOD

(75) Inventor: Robert D. Butterfield, Poway, CA (US)

(73) Assignee: Cardinal Health 303, Inc., San Diego, CA (US)

( * ) Notice: Subject to any disclaimer, the term of this patent is extended or adjusted under 35 U.S.C. 154(b) by 0 days.

(21) Appl. No.: 11/097,725

(22) Filed: Apr. 1, 2005

(65) Prior Publication Data

US 2006/0224349 A1   Oct. 5, 2006

(51) Int. Cl.
*G01K 1/00*   (2006.01)

(52) U.S. Cl. ............... 702/130; 374/169; 374/102; 374/103; 374/107; 374/183; 73/362; 73/432 R

(58) Field of Classification Search ............ 702/130
See application file for complete search history.

(56) References Cited

U.S. PATENT DOCUMENTS

| | | | |
|---|---|---|---|
| 4,161,880 A | 7/1979 | Prosky | |
| 4,232,682 A | 11/1980 | Veth | |
| 4,464,067 A | 8/1984 | Hanaoka | |
| 4,592,000 A * | 5/1986 | Ishizaka et al. ............ | 702/131 |
| 4,727,500 A | 2/1988 | Jackson et al. | |
| 4,843,577 A | 6/1989 | Muramoto | |
| 4,866,621 A | 9/1989 | Ono | |
| 4,878,184 A | 10/1989 | Okada et al. | |
| 5,015,102 A | 5/1991 | Yamaguchi | |
| 5,066,141 A | 11/1991 | Ikeda et al. | |
| 5,259,389 A | 11/1993 | Muramoto et al. | |
| 5,473,629 A | 12/1995 | Muramoto | |
| 5,632,555 A | 5/1997 | Gregory et al. | |
| 5,638,418 A | 6/1997 | Douglass et al. | |
| 6,000,846 A | 12/1999 | Gregory et al. | |
| 6,299,347 B1 | 10/2001 | Pompei | |
| 2002/0003832 A1* | 1/2002 | Siefert ....................... | 374/169 |
| 2002/0105436 A1 | 8/2002 | Bell et al. | |
| 2003/0169800 A1 | 9/2003 | Pompei | |

FOREIGN PATENT DOCUMENTS

| | | |
|---|---|---|
| EP | 0 413 814 A1 | 2/1991 |
| EP | 0 561 348 A1 | 9/1993 |

OTHER PUBLICATIONS

International Search Report—International Application No. PCT/US2006/010998; International Filing Date: Mar. 24, 2006.

* cited by examiner

*Primary Examiner*—John Barlow
*Assistant Examiner*—Sujoy Kundu
(74) *Attorney, Agent, or Firm*—McDermott Will & Emery

(57) ABSTRACT

A thermometer system and method that rapidly predict body temperature based on the temperature signals received from a temperature sensing probe when it comes into contact with the body. A nonlinear, multi-parameter curve fitting process is performed and depending on the errors in the curve fit, parameters are changed or a prediction of the temperature is made. Criteria exist for the differences between the curve fit and the temperature data. The processor switches to a Continuous Monitor State if the curve fit over a limited number of time frames is unacceptable. Determining the start time on which the measurement time frame for prediction is based is performed by tissue contact threshold coupled with a prediction time delay.

25 Claims, 7 Drawing Sheets

TEMPERATURE PREDICTION SYSTEM AND METHOD

BACKGROUND

The invention relates generally to improvements in thermometers and, more particularly, to electronic predictive thermometers for more rapidly obtaining accurate temperature measurements from a plurality of patient measurement sites.

It is common practice in the medical arts, as in hospitals and in doctors' offices, to determine the body temperature of a patient by means of a temperature sensitive device that measures the temperature and displays that measured temperature. One such device is a glass bulb thermometer incorporating a heat responsive mercury column that expands and contracts adjacent a calibrated temperature scale. Typically, the glass thermometer is inserted into the patient, allowed to remain for a sufficient time interval to enable the temperature of the thermometer to stabilize at the body temperature of the patient, and subsequently removed for reading by medical personnel. This time interval is usually on the order of two to eight minutes.

The conventional temperature measurement procedure using a glass bulb thermometer or the like is prone to a number of significant deficiencies. Temperature measurement is rather slow and, for patients who cannot be relied upon (by virtue of age or infirmity) to properly retain the thermometer for the necessary period of insertion in the body, may necessitate the physical presence of medical personnel during the relatively long measurement cycle, thus diverting their attention from other duties. Furthermore, glass bulb thermometers are not as easy to read and, hence, measurements are prone to human error, particularly when made under poor lighting conditions or when read by harried personnel.

Various attempts have been made to minimize or eliminate these deficiencies of the glass bulb thermometer by using temperature sensing probes that are designed to operate in conjunction with direct reading electrical thermometer instrumentation. In one such approach, an electronic temperature sensitive device, such as a thermistor, is mounted at the end of a probe and inserted into the patient. The change in voltage or current of the device, depending on the particular implementation, is monitored and when that output signal stabilizes, a temperature is displayed in digital format. This is commonly referred to as the direct reading approach and while it reduces the possibility of error by misreading the measured temperature, it may still require a relatively long period of time in which to reach a stabilized temperature reading. In the typical direct reading approach or mode, anywhere from three to five minutes are required for obtaining a temperature reading.

An inherent characteristic of electronic thermometers is that they do not instantaneously measure the temperature of the body to which they are applied. It may take a substantial period of time before the temperature indicated by the thermometer is representative of the actual temperature of the body measured. This lag is caused by the various components of the measurement system that impede heat flow from the surface of the body to the temperature sensor. Some of the components are the sensor tip, the skin and tissue of the body, and any hygienic covering applied to the sensor tip to prevent contamination between measurement subjects. This approach therefore provides only a partial solution.

One attempt to overcome the above-described deficiencies involves the use of a temperature sensitive electronic probe coupled with prediction or estimation circuitry to obtain a direct digital display of the patient's temperature before the probe has reached equilibrium with the patient. With this approach, assuming the patient's temperature is not significantly changing during the measurement time, the temperature that will prevail upon thermal stabilization of the electronic thermometer with the patient is predicted from measured temperatures and is displayed before thermal stabilization is attained. In many prior devices, prediction of temperature is performed by monitoring the measured temperature over a period of time, computing derivatives, and processing these variables to predict the patient's temperature.

With an electronic thermometer that operates by predicting the final, stable temperature, an advantage is that the temperature measurement is completed before thermal stabilization is attained, thereby reducing the time required for measurement. This would lessen the risk that the patient would not hold the probe in the correct position for the entire measurement time and requires less time of the attending medical personnel. Another advantage is that, because body temperature is dynamic and may significantly change during the two to eight minute interval associated with traditional mercury glass thermometer measurements, a rapid determination offers more timely diagnostic information. However, a disadvantage with such a thermometer is that the accuracy with which temperature is predicted declines markedly unless the processing and analysis of the data are accurately performed.

Electronic thermometers using predictive-type processing and temperature determination may include a thermistor as a temperature-responsive transducer. The thermistor approaches its final stable temperature asymptotically with the last increments of temperature change occurring very slowly, whereas the major portion of the temperature change occurs relatively rapidly. Such a temperature response is shown in FIG. 1. A graph of measured temperature 20 plotted as a function of measurement time 22 and temperature 24 for a typical thermistor is shown. As discussed above, the temperature 20 indicated by the thermistor lags the actual temperature $T_F$ 26 of the subject being measured. This lag can be seen by comparing the measured temperature line 20 to the subject's actual temperature line 26. It can be seen that as the measurement progresses from a start time, $t_0$, the temperature rapidly increases from $T_R$ to $T_1$ between times to $t_0$ $t_1$. The rate of increase in the indicated temperature is reduced between times $t_1$ and $t_2$, and the temperature line gradually tends toward the stabilization temperature $T_F$ 26 asymptotically as the time increases even more. As discussed above, the present invention is directed to a system capable of analyzing the temperature data gathered during an early period of the measurement, for example, between times $t_1$ and $t_2$, and predicting the final temperature $T_F$. Prior attempts have been made to monitor that initial, more rapid temperature change, extract data from that change, and estimate the actual temperature of the tissue that is contacting the thermistor at that time, long before the thermistor actually stabilizes to the tissue temperature.

A prior approach used to more rapidly estimate the tissue temperature prior to the thermistor reaching equilibrium with the patient is the sampling of data points of the thermistor early in its response and from those data points, predicting a curve shape of the thermistor's response. From that curve shape, an asymptote of that curve and thus the stabilization temperature can be estimated. To illustrate these concepts through an example of a simpler system, consider the heat transfer physics associated with two bodies of unequal temperature as shown in FIG. 2, one having a large thermal mass and the other having a small thermal mass, placed in contact with each other at time=0. As time progresses, the temperature of the small thermal mass and the large thermal mass equilibrate to a temperature referred to as the stabilization temperature. The equation describing this process is as follows:

$$T(t) = T_R + (T_F - T_R) \cdot (1 - e^{-(\frac{t}{\tau})}) \quad \text{(Eq. 1)}$$
$$= T_F - (T_F - T_R) \cdot e^{-(\frac{t}{\tau})}$$

where: $T(t)$ is the temperature of the smaller body as a function of time,
$T_F$ is the stabilization temperature of the system,
$T_R$ is the initial temperature of the smaller body,
t is time, and
$\tau$ is the time constant of the system.

From this relationship, when the temperature T is known at two points in time t, for example $T_1$ at time $t_1$ and $T_2$ at time $t_2$, the stabilization temperature $T_F$ can be predicted through application of Equation 2 below.

$$T_F = \frac{T_2 - T_1 e^{\frac{t_2 - t_1}{\tau}}}{1 - e^{\frac{t_2 - t_1}{\tau}}} \quad \text{(Eq. 2)}$$
$$= \frac{T_2 e^{\frac{t_2}{\tau}} - T_1 e^{\frac{t_1}{\tau}}}{e^{\frac{t_2}{\tau}} - e^{\frac{t_1}{\tau}}}$$

Further, for a simple first order heat transfer system of the type described by Equation 1, it can be shown that the natural logarithm of the first time derivative of the temperature is a straight line with slope equal to $-1/\tau$ as follows:

$$\ln\left(\frac{dT}{dt}\right) = K - \frac{1}{\tau} \quad \text{(Eq. 3)}$$

and also:

$$T_F = T(t) + \tau \cdot T'(t) \quad \text{(Eq. 4)}$$

where:

$$\tau = -\frac{T'(t)}{T''(t)} \quad \text{(Eq. 5)}$$

where K=a constant dependent upon $T_R$, $T_F$, and $\tau$,
T'=first derivative of temperature
T"=second derivative of temperature Prior techniques have applied these simple first order relationships to the analysis of the temperature equilibration curve. In some cases use has been made of thermistor time constants established by the thermistor manufacturer. However, all these techniques have failed to recognize that the temperature response curve cannot be accurately modeled as first order since it is determined by the complex thermodynamic interactions of the patient's tissue and vascular system with the hygienic probe cover, sensor, and probe stem. When the thermometer is placed in contact with body tissue, such as a person's mouth for example, the response curve is affected by the physical placement of the probe in relation to that tissue, by the heat transfer characteristics of the particular tissue, by the hygienic probe cover 34 (FIG. 2) that separates the probe from the tissue, and by heat transfer through the probe sensing tip and shaft 36, as is shown in FIG. 3. Each of these factors 36 in FIG. 3 affect the flow of heat from the thermistor and each possesses distinct thermodynamic qualities including thermal resistance and heat capacity. The biological factors 38 affect the flow of heat to the thermistor and vary significantly between patients, in particular with age and body composition. The factors, combined with the spatial geometry of the structures, cause the temperature sensed at the thermistor to follow a more complex characteristic curve than is predictable from a simple model such as that obtained using a priori factory-supplied time constant of the thermistor alone.

Previous estimation techniques have depended on the assumption that the temperature rise following skin contact followed an exponential curve (so called Newton "heating"). Such a model would be accurate under conditions where an infinite and well-stirred source of heat was available to warm the sensor, again as illustrated by FIG. 2. A probe cover 34 is mounted over the temperature sensor or probe 32 which is immersed in a large source of water 30 with specific heat and an initial temperature "$T_w(0)$". The probe has a thermal mass "M" and an initial temperature "$T_p(0)$". The probe cover has a thermal resistance "R". Under these ideal conditions the flow of heat from the water bath to the probe is controlled by the simple equation:

$$\dot{Q} = \frac{T_W - T_P}{R} = \frac{\Delta T}{R} \quad \text{(Eq. 6)}$$

where $\dot{Q}$=flow_of_heat

Solving the differential equation for probe temperature at any time yields an equation of the form following for the probe temperature at any time "t" following immersion in the water:

$$T_P(t) = T_W(0) - [T_W(0) - T_P(0)] \cdot e^{\frac{t}{R \cdot M}} \quad \text{(Eq. 7)}$$

The "time constant" of the thermal rise is determined largely by "M" the product of the thermal mass of the probe and "R" the thermal resistance of the probe cover.

Application of this simple model to the warming of a temperature probe placed in contact with a portion of the body such as the mouth or the axilla fails to account for the finite heat capacity of the tissues in the immediate region of the probe and for the thermal resistance of the successive layers of tissue beginning with epidermal layer and proceeding to the inner structures.

In particular, as the probe temperature increases, heat from the immediate region in contact with the probe has been removed requiring additional heat energy to travel through more tissue in order to reach the probe. This "remote" heat energy thus has a longer "time constant" than heat energy that has flowed into the probe from more proximate regions.

At any time "t", there will be a temperature difference between the current value and the final value given by:

$$\frac{\frac{d}{dt}\left[e^{\frac{-t}{R\cdot M}}\right]}{e^{\frac{t}{R\cdot M}}} = -\frac{1}{R\cdot M} \qquad \text{(Eq. 8)}$$

Thus the limits of Equation 2 to model the complex conduction in body tissue may be seen by considering that the "rate of change" of temperature it predicts remains a constant proportion of the temperature change remaining to occur at any point in time.

The need therefore has arisen for a measurement system that can predict stabilization temperatures and can adapt to the changing heat flow characteristics of both the body under measurement and the measurement system itself, unlike a first order model. Prediction techniques have been proposed that use sets of simultaneous equations solved in real time to yield a likely temperature rise curve that indicates the stabilization temperature. To be successful, such techniques require use of equations with substantial numbers of coefficients so that the shape of the rise curve can be adequately approximated. Practical constraints limit the number of terms that can be employed and thus impose limits of the accuracy of such approaches. Furthermore, the computational solution of these equations is not a trivial matter when relatively simple, low power, microprocessor circuitry is used in the thermometer.

It is also noteworthy that while manufacturers can develop very sophisticated medical devices, the question of cost must be constantly kept in mind. Manufacturers strive to keep the cost of medical equipment as low as possible so that they can be made available to a wide variety of patients. While a thermometer with a much larger processor, with much faster computational speed, with much larger memory size could be made available so that computations could be performed faster and many more computations could be performed, the question of cost arises. Such increase in processing power would substantially increase the cost of a thermometer and may consequently make it unavailable to many patients. Instead, those skilled in the art desire a thermometer that is cost efficient but through the use of robust, accurate, and rapidly executing algorithms, is able to provide through sophisticated temperature data processing, accurate and fast prediction of the patient's temperature.

A need has also been recognized for a single thermometer that can measure temperature at the oral, rectal, and axilla sites of a patient. Various factors may come into play with a particular patient that make one or more of these sites unavailable for use in temperature measurement. Therefore a thermometer that can measure all three sites would provide a desired advantage over the need to find different thermometers for different sites. It should be recognized that measuring the temperature at the axilla site of a patient differs significantly from the oral and rectal sites. The temperature response of a probe to the axilla site is in most cases much different from the oral and rectal sites. Due to the fact that this site is composed of non-mucous epidermal tissues with an underlying stratum of fatty tissues, the curvature of the temperature response of a probe located in the axilla is much flatter than that of oral and rectal sites (see FIG. 6 where curve 100 is typical for an oral site and curve 102 is typical for a axillary site).

While prior predictive thermometry techniques have advanced the art of electronic thermometry significantly, those skilled in the art have recognized that a need still exists for an electronic thermometer that can predict a stabilization temperature at an early stage of the measurement process where measurement conditions and the characteristics of the subject under measurement vary from measurement to measurement. Additionally, it has been recognized that a need exists for a single thermometer that can measure and predict the patient's temperature from multiple sites, such as all of the oral, rectal, and axilla sites. Further, a need exists for a medical thermometer that is accurate, yet comprises relatively simple, inexpensive circuitry. The invention fulfills these needs and others.

SUMMARY OF THE INVENTION

Briefly and in general terms, the present invention provides a thermometer and method for determining the temperature of a subject by predicting the subject's temperature at an early stage of the measurement process. The thermometer system and method of the present invention adapt a nonlinear model containing multiple parameters to fit a model curve to the monitored temperature data. The parameters are selected at an early portion of the temperature rise curve and from the resulting model curve, the equilibrium temperature of the sensor, and hence the subject, is predicted. In this way, the predictive process is adaptive with respect to the thermal characteristics of the thermometer probe as well as the anatomy and physiology of the subject, and requires relatively little data acquisition and data processing time while yielding accurate predictions of the equilibrium temperature of the sensor.

In one detailed aspect, one of the parameters, the "curvature index" C, is typically evaluated over a range of values appropriate to the selected anatomical site of measurement. Because of the adaptive characteristic of the thermometer system and method in accordance with the invention, multiple sites on a patient may be measured with a single thermometer.

In other aspects, a sensor provides temperature signals in response to sensing the temperature of the subject, the temperature signals varying in time. A processor monitors the temperature signals over a first selected time frame, determines a selected characteristic subset of temperature samples of the first time frame, provides or "fits" a model temperature curve based on calculations of a set of nonlinear curve fitting parameters of the characteristics of the monitored temperature signals and based on the model curve, predicts the temperature of the subject. In a more detailed aspect, the processor selects the first time frame from a time period occurring before the sensor reaches the temperature of the subject and uses the nonlinear curve fitting parameters to provide the model curve to calculate a prediction of the temperature of the subject. In another more detailed aspect, the processor compares the model curve to the monitored temperature data and if the differences do not exceed a threshold, the processor predicts the subject's temperature from the model curve and displays it. In another more detailed aspect, the processor employs model parameters determined for the selected region to compute an offset term that is a linear function of the selected model parameter. In another more detailed aspect, the model parameter used to compute an offset term is related to the curvature parameter. In another more detailed aspect, the processor employs a time delay before the start of the selected prediction window to compute an offset term that is a linear function of the selected model parameter.

In further aspects, the processor compares the nonlinear curve fitting of the selected first time frame to a predetermined integrity criterion and if the predicted temperature from the first frame does not meet the integrity criterion, the processor excludes the first time frame from its calculation of the temperature of the subject.

In another aspect, the processor compares the aspects of the monitored temperature data to integrity criteria and if any characteristics of the monitored temperature data do not satisfy the integrity criteria, the processor does not use the data to predict the temperature of the subject. In yet further detailed aspect, one of the integrity criteria comprises a curvature quality of the monitored temperature data. In another further detailed aspect, another of the integrity criteria comprise a slope limit of the monitored temperature data. In yet another aspect, if the monitored temperature data does not satisfy the integrity criteria, the processor selects a different window of monitored temperature data to compare to the integrity criteria.

In yet another aspect, the processor monitors the temperature signals over a second selected time frame if the first selected time frame is excluded in determining the temperature of the subject. Further, the processor selects the second time frame to occur after the first time frame in one aspect and in another aspect, the processor selects the second time frame to overlap the first time frame.

In a broader aspect, the processor monitors the temperature signals over a plurality of different selected time frames if the preceding time frame is excluded from the determination of the temperature of the subject and the processor limits the number of the plurality of time frames monitored to those occurring within a predetermined period before the sensor reaches the temperature of the subject.

In a different aspect, the processor determines a start time at which the sensor has begun sensing the temperature of the subject and the processor selects the first time frame to include temperature signals occurring after the start time. In a more detailed aspect, the processor determines that the sensor is sensing the temperature of the subject by calculating the current value of the temperature signals from the sensor and when the current value exceeds a tissue contact threshold temperature, sets the start time based on the calculation.

Other features and advantages of the present invention will become apparent from the following detailed description, taken in conjunction with the accompanying drawings which illustrate, by way of example, the features of the invention.

DETAILED DESCRIPTION OF THE PREFERRED EMBODIMENTS

Figure 4:
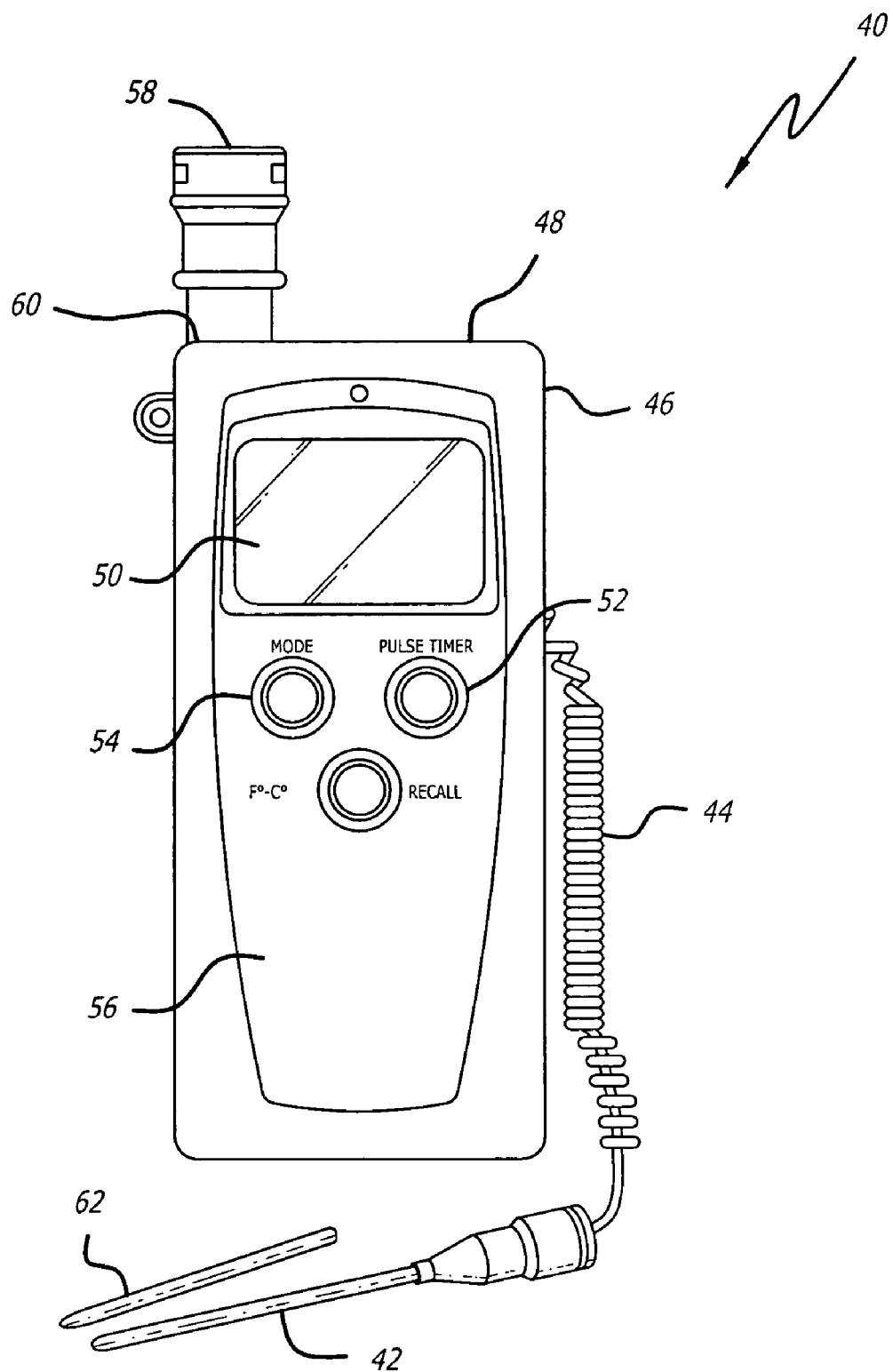
FIG. 4 front view of a portable thermometer having two probes, a probe cover, a display, and input means useful for measuring the temperature of a subject.

In the following description, like reference numerals will be used to refer to like or corresponding elements in the different figures of the drawings. Referring now to the drawings, and particularly to FIG. 4, there is shown one embodiment of an electronic thermometer 40 incorporating novel features of the present invention. The electronic thermometer contains a probe 42 for sensing the temperature of a selected part of the patient's body, connected by conductors 44 to the main body 46 of the thermometer. The probe has been removed from a storage well 48 in the main body. The main body of the thermometer contains the electrical components and power supply of the thermometer, and also has a display 50 for displaying temperature values and error or alarm messages, and a first input device 52, which in this case, is an on/off switch located below the display. A MODE switch 54 is also provided at the front panel 56 of the main body to select the site and method of processing the temperature data more appropriately so that the characteristics of sites are considered during temperature measurement. In one embodiment, the MODE switch provides the selections of "FAST ORAL," "FAST AXILLARY," and "FAST RECTAL." A second probe 58 is included with the thermometer and is shown in the stored position inserted in a well 60 of the main body. In accordance with the present embodiment, one probe is to be used for measuring a patient's oral and axillary temperatures and the other probe is to be used for rectal temperature measurement. Also shown is an hygienic cover 62 for placement over a probe before contact with the patient.

Figure 5:
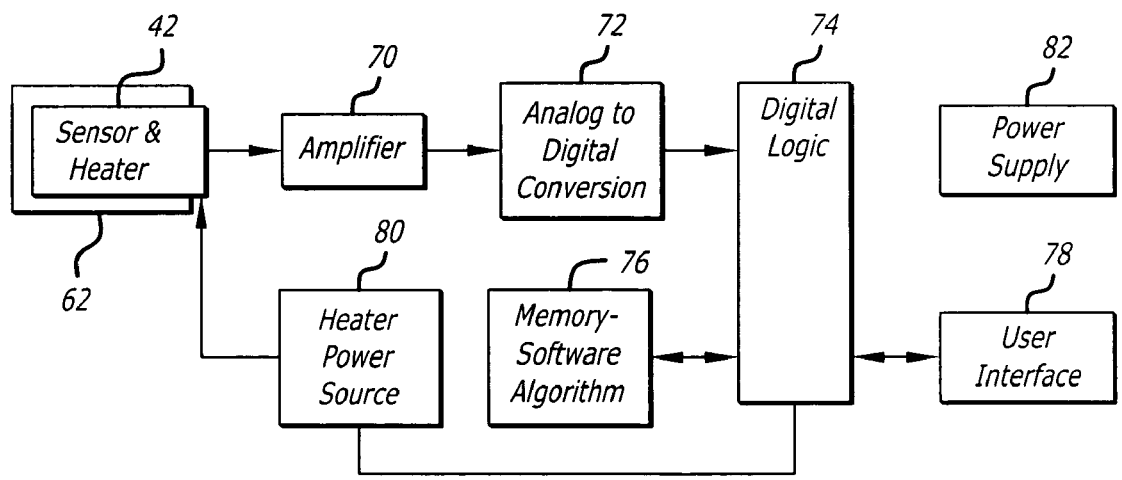
FIG. 5 is a block diagram of a system in accordance with principles of the invention for determining the temperature of a patient before final equilibration of the temperature sensor of the system with the patient through prediction of the patient's temperature based on analysis of temperature data obtained before equilibration.

Referring to FIG. 5, the block diagram generally shows major electronic components of one embodiment of a thermometer 40 in accordance with aspects of the present invention. The temperature sensor 42 provides temperature signals in response to the temperature sensed during measurement. There also exists the probe cover 62 located between the patient and the sensor of the probe. In the case where a thermistor is used as the temperature sensor, these signals are analog voltages representative of the resistance of the thermistor and therefore representative of the sensed temperature. The signals representative of temperature are amplified by the amplifier 70 and then are converted into digital form for further processing by an analog-to-digital converter 72. The analog-to-digital converter is connected to a processor 74 that receives the digitized voltage signals and processes them to determine the temperature of the subject being measured. A memory 76 stores the temperature and time signal data, along with algorithms, so that the signal data can be analyzed at a subsequent time. Once the signals have been processed, the processor provides a signal to the display 78 to display the predicted stabilization temperature. The probe includes a heater device that is controlled by a heater power source 80. The processor controls the probe heater to raise the temperature of the probe to a set point once it is withdrawn from the well of the body by turning on the heater power source. Such a set point is typically 93° F. (33.9° C.) but other temperatures may be selected. Activating a switch enables the temperature measurement functions of the thermometer. This switch is preferably located within the probe storage well such that removal of the probe automatically enables the measurement. A power supply 82 is provided for the power needs of the various components. Specific connections between the power supply and the components are not shown to retain clarity of the illustration; however those skilled in the art well understand such connections.

Although the electronic predictive thermometer is shown in a particular embodiment in FIG. 5, this is for illustrative purposes only. The memory 76 may actually comprise multiple memory devices. The processor 74 may comprise multiple processors. The user interface 78 may comprise multiple switches or displays. It will be apparent to those skilled in the art that various modifications may be made to FIG. 5.

Figure 6:
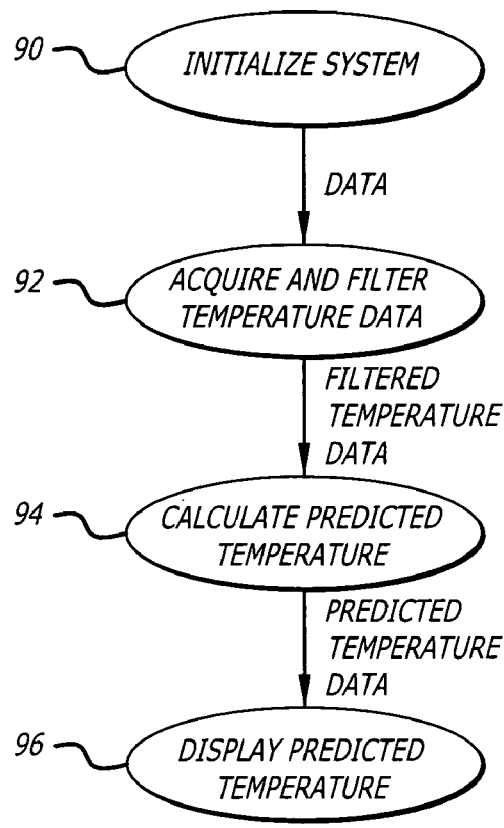
FIG. 6 is a flow chart showing temperature data gathering and processing for predicting and displaying temperature in accordance with aspects of the invention.

Referring now to FIG. 6, general functions (tasks) of an embodiment of a method in accordance with aspects of the invention are shown, along with the data that flows among them. The tasks may run concurrently or in sequence, and some tasks shown may not run during a particular measurement carried out by the system. A data flow does not imply an activation sequence; control and activation are not shown on this diagram.

The thermometer system is initialized 90 and data from the temperature sensor begins to be generated. When sufficient temperature samples (data) have been acquired, they are then filtered 92. The filtering depends on the filter type, order, and model implemented. In one case, a simple boxcar averager/decimator is used. Other more sophisticated filters may be used. The filtered temperature data is then used by the processor in calculating a predicted temperature 94. Once an acceptable calculation of predicted temperature has been made, it is displayed 96.

A generalized embodiment of a means for making temperature prediction for each of three oral, rectal, and axillary sites will now be discussed. Operator selection of a chosen site determines a selected set of control parameters and thresholds for use at that site.

Overview of ABCE Nonlinear Multi-Parameter Curve Fit Prediction

Figure 8:
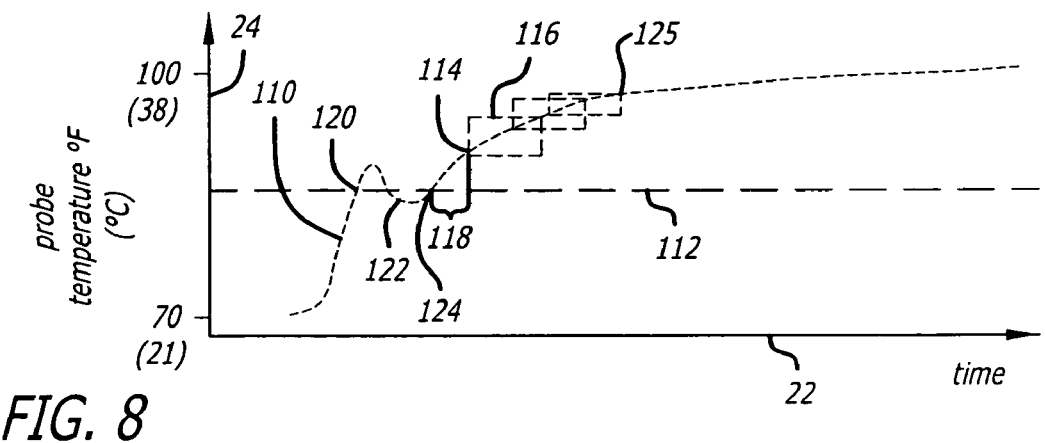
FIG. 8 is a temperature graph showing a tissue contact threshold, a prediction start delay, a prediction start, and a prediction complete point in accordance with aspects of the invention to predict the temperature of a subject.

Estimation or prediction of the temperature at a defined future time (such as a time at which the sensor would be expected to have equilibrated with the patient's temperature) is performed by fitting a non-linear multi-parameter model (Equation 9) to a sequence of filtered temperature samples (a "window") occurring following tissue contact (see FIG. 8).

$$T_{fit}(n \cdot \tau) = A + \frac{B}{1 + n \cdot \tau \cdot C^E} \qquad \text{(Eq. 9)}$$

where:
$T_{fit}$ (n·τ) is the estimate of the temperature at a particular time t=n·τ(° F.);
n is an integer sample index initialized to 0 at the first sample meeting conditions for "Prediction Start";
τ is the number of seconds per sample (sec);
A is the "offset" parameter (° F. or ° C.);
B is the "span" or "range" parameter (° F. or ° C.);
C is the "curvature" or "rate of equilibration" parameter (sec$^{-1}$); and
E is the "time warp" factor (unit-less) that may be used to make a nonlinear modification of the curvature of the model curve to make it better fit the curve of the temperature data.

If the fit achieved in the first window does not meet criteria for prediction, the window is "slid" forward by one measurement sample (one second average of ten samples, see details of TAD computation below) and the model parameters are recomputed.

For each of a number of discrete values of C and E, model parameters (A, B) are computed using linear least squares optimization methods. The solution set of A, B, C, and E that achieves the minimum "sum squared error" measured as the difference between model curve values and the window data element values is termed Am, Bm, Cm, and Em for that window. If this value is less than a defined threshold and other curvature quality ("CQI" described below) and slope conditions ("WindowSlope" also described below) are met in this window, the parameters ABC are used to predict temperature using Equation 10 below.

$$T_{predict}(n \cdot \tau) \equiv A_m + \frac{B_m}{1 + n \cdot \tau \cdot C_m} + D(C_m) + D(w) + D_0 \qquad \text{(Eq. 10)}$$

where:
D($C_m$) is the "curvature adjustment factor";
D(T) is the "time adjustment factor";
$D_o$ is the offset constant;
w is the number of seconds elapsed since Prediction Start occurred; and
n·τ is the number of seconds in the future, relative to Start of Prediction, when the temperature is to be estimated.

Figure 10:
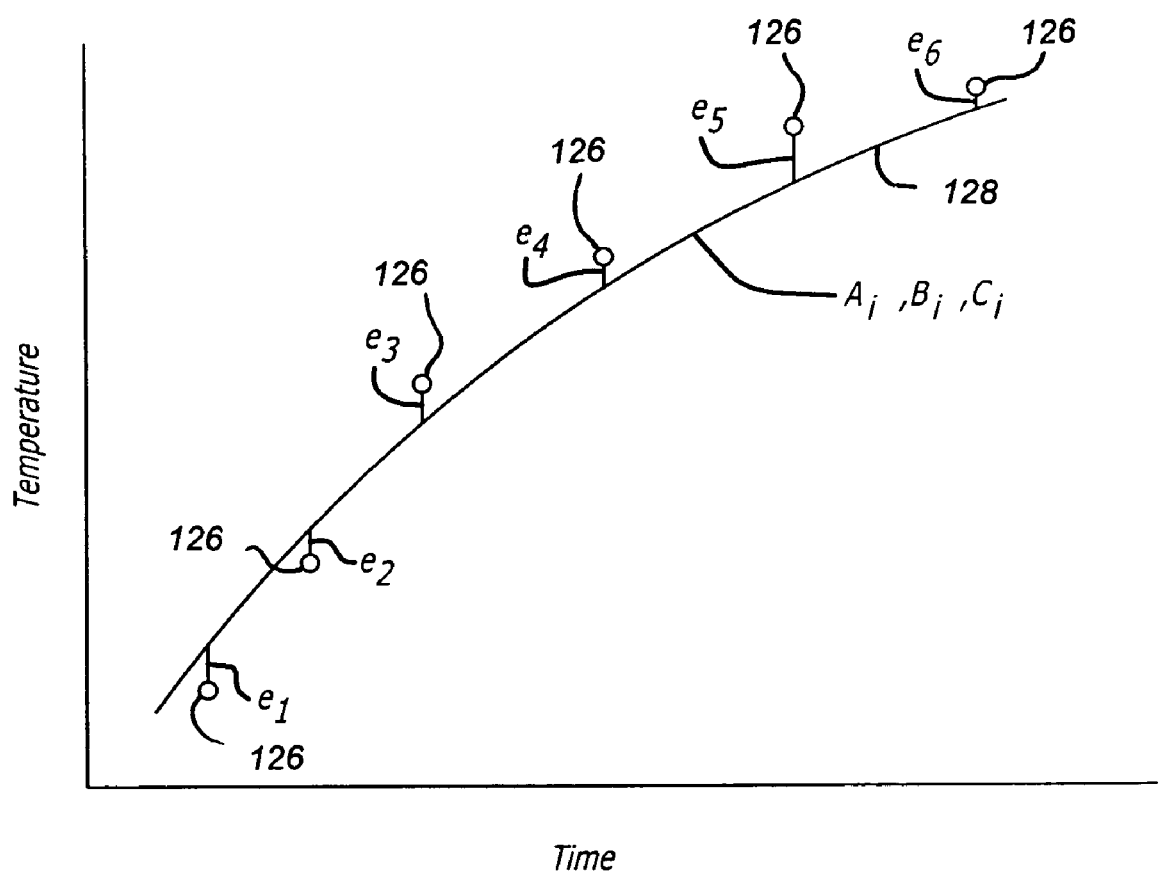
FIG. 10 shows curve fitting a model temperature curve to actual measured data points, and determining the differences between that model curve and each of the actual data points, to be used in determining if the model curve has an acceptable "fit" to the data.

It will be noted that the exponent "E" for $C_m$ (see Eq. 9) has been set to "1" in the embodiment of FIG. 10. However in another embodiment, it may be set to a value other than "1" to more precisely fit the model curve to the curvature of the temperature data. The temperature data is time dependent, that is, each data point was taken at a discrete point in time. When the data points are interconnected to show a temperature data "curve", such a curve has time as one axis and can therefore also be thought of as a time curve. This exponent "E" nonlinearly modifies the curvature of the model curve to more precisely match the curvature of the temperature/time data and is therefore referred to as a "time warp" factor since it alters the model curve in a time sense. Varying the exponent "E" to more precisely match the data curve would require more processing time and power.

Figure 7:
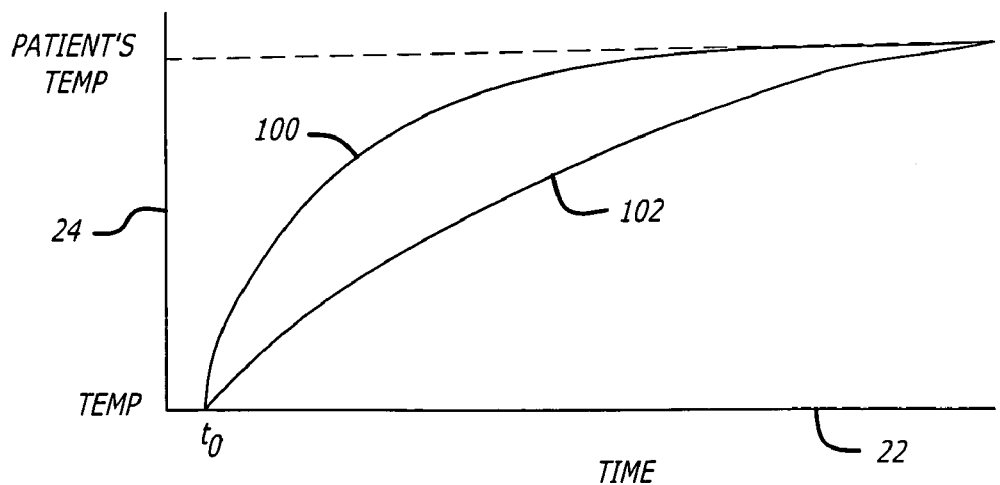
FIG. 7 shows exemplary response curves of a thermistor sensor device showing its curvature for temperature measurement at oral and rectal measurement sites and a second line for temperature measurement at an axillary site showing that the curvature of the response line at the axillary site is much less than at the oral/rectal sites.

The model curve produced by Equation 10 predicts the rate of the probe temperature when being "warmed" by contact with tissue. The design requires higher C values for oral/rectal measurements compared to axillary due to the difference in heat transfer at these locations. A rough comparison is shown in FIG. 7. The graph line 100 presents a typical shape of the temperature response to the oral and rectal sites. The graph line 102 presents a typical shape of the temperature response to the axillary site. It is apparent that the curvature for the oral and rectal sites is much greater than that of the axillary site. Some control parameters and thresholds are also different for axillary vs oral/rectal mode. These differences are described below.

Further, once the various values of the factors have been determined (A, B, C, and D), the time of n·τ can then be entered to determine the prediction of the equilibrium temperature. As an example, the value of 180 seconds may be entered for an oral or rectal measurement while a value of 300 seconds may be entered for an axillary measurement. The result of solving equation 10 ($T_{predict}$) will then be the equilibrium temperature.

The factors D(C), D(w), and $D_0$ compensate for minor systematic errors in the prediction which may arise in part when the E term is fixed. D(C) is a linear adjustment of the form:

$$D(C) \equiv C_{slope} \cdot C \qquad \text{(Eq. 11)}$$

where:
$C_{slope}$ is a constant;
C is the estimated value associated with the smallest sum square error.

D(w) similarly is the form:

$$D(w) \equiv T_{slope} \cdot w \qquad \text{(Eq. 12)}$$

where:
w is the time elapsed since Prediction Start (seconds) at the time the current window is evaluated; and
$D_o$ is constant which is used to remove bias effects of D(w) and D(C) as well as minor systematic offsets statistically observed in population studies.

The range of "C" values used and the values for the "D" terms have been selected based on actual temperature tests of a wide, randomly-selected subject population. Based on those actual temperature tests, all of these values have been set to optimize the performance of the prediction of temperature for this wide population of subjects. However, as is apparent to those skilled in the art, the values may be changed depending on test results with other subject populations. It should also be noted that some or all of the "D" terms may go to a zero value, depending on the actual data measured. Further, if the exponent "E" for the "C" term in Eq. 9 is used to control the curvature of the model, the "D" terms may not be needed and can be set to zero. The "D" terms are used to provide some compensation for the shape of the model curve when the exponent "E" is set to one, as in Eq. 10. This embodiment of setting the exponent "E" to one and using the linear "D" terms was found to lower the demands on the processor yet yield accurate prediction results.

If the estimated temperature is outside the Low or High Prediction limits, the instrument automatically transitions to the "Continuous Monitoring State." The "Continuous Monitoring State" is the state in which the thermometer does not predict the temperature of the subject but instead simply remains active until it has equilibrated with the temperature of the subject. Depending on the anatomical site selected, contact, fluid coupling, and pressure applied, this may take from three to eight minutes.

FIG. 8 illustrates a typical temperature profile and key features of the prediction process. When the probe 42 is removed from the instrument "well" 48 (see FIG. 4), it is typically at room ambient temperature. The probe heater power supply 80 (see FIG. 5) is activated 110 bringing the probe temperature to a target setpoint by means of the probe heater, but it may overshoot several degrees and oscillate, particularly if the probe cover 62 is not mounted on the probe. The probe cover is then mounted to the probe. When the probe with cover is placed in contact with tissue, the temperature rises from the setpoint surpassing Tissue Contact Threshold 112 causing the heater to shut off.

Determination of Prediction Start is accomplished by detection of the raw (100 ms) temperature exceeding Tissue Contact Threshold followed by a fixed, mode-dependent time delay. The delay is extended if the raw temperature falls below the Tissue Contact Threshold before reaching the Prediction Start condition.

Beginning with the raw sample meeting criteria for Prediction Start 114, raw temperature samples in blocks of 10 are averaged and stored producing an array (window) 116 of ten filtered samples. Each such average of ten is referred to as a "TAD" (Temperature Averaged and Decimated). If any TAD value is less than the maximum TAD value recorded by more than 1° F. (≈0.5° C.), the instrument state is changed to Continuous Monitoring State since loss of tissue contact is presumed to have occurred.

The TAD samples in each window are used to compute a curvature quality index (CQI) and a Window Slope value. These values, together with the Sum Squared Error (SSE) must all meet specified criteria in order for a prediction to be presented. If they are not met, a subsequent window is formed as follows. The TAD value for each successive second is added to the estimation window, and the oldest TAD value is removed until either a successful individual window prediction is produced or the maximum number of windows (MaxNumWindows) has been reached.

If the final window is reached, and its SSE, CQI, and WindowSlope values do not achieve specified thresholds, then the SSE of the final window is compared against a threshold FSSE. If this is successful, then the prediction from the final window is made, otherwise the instrument transition into the Continuous Monitoring State. For any prediction that is otherwise qualified, if the predicted temperature is outside the Low or High prediction limits, the instrument automatically transitions to the Continuous Monitoring State.

Several other conditions may initiate transition from the Prediction to the Continuous Monitoring state. These conditions are set by the software routines controlling the heater and monitoring the probe for failure of the thermistor. They are shown in FIG. 12 for completeness and described elsewhere in this specification.

Temperature Averaging and Decimation (TAD Processing)

The instrument samples a voltage from the temperature probe amplifier 70 (FIG. 5), and digitally converts this value at 100 millisecond intervals. For efficiency and noise suppression, the 100 millisecond ("raw) samples are pre-filtered with a simple boxcar averager/decimator (Equation 13) to produce "temperature averaged decimated" or "TAD" samples at one second intervals.

$$TAD_i = \sum_{j=1}^{N} T_{j+N\cdot(i-1)} \quad \text{(Eq. 13)}$$

where N is the number of TAD samples/window, and where the first sample of the first TAD is that sample after the Prediction Start Delay 118. Prediction Start Delay in turn begins with the first sample exceeding the tissue contact temperature of 94° F. (34.4° C.). If during the Start Delay period, the raw temperature falls below the Tissue Contact Threshold, the Prediction Start Delay Timer is reset.

Prediction Window Sample Selection

Thermal equilibration curves frequently contain artifacts arising from several sources. The system and method in accordance with aspects of the invention attempt to avert the effects of artifacts through optimized selection of input data. In the first few seconds following tissue contact, residual effects of the probe heating may affect the equilibration curve shape. The sooner the probe contacts tissue after removal from the instrument, the more likely these effects are to be present. Variation in the position and/or compression of the probe cover with the skin varies the thermal resistance between tissue and cover. This affects both the shape of the thermal equilibration curve and the magnitude of the equilibration temperature.

Figure 12:
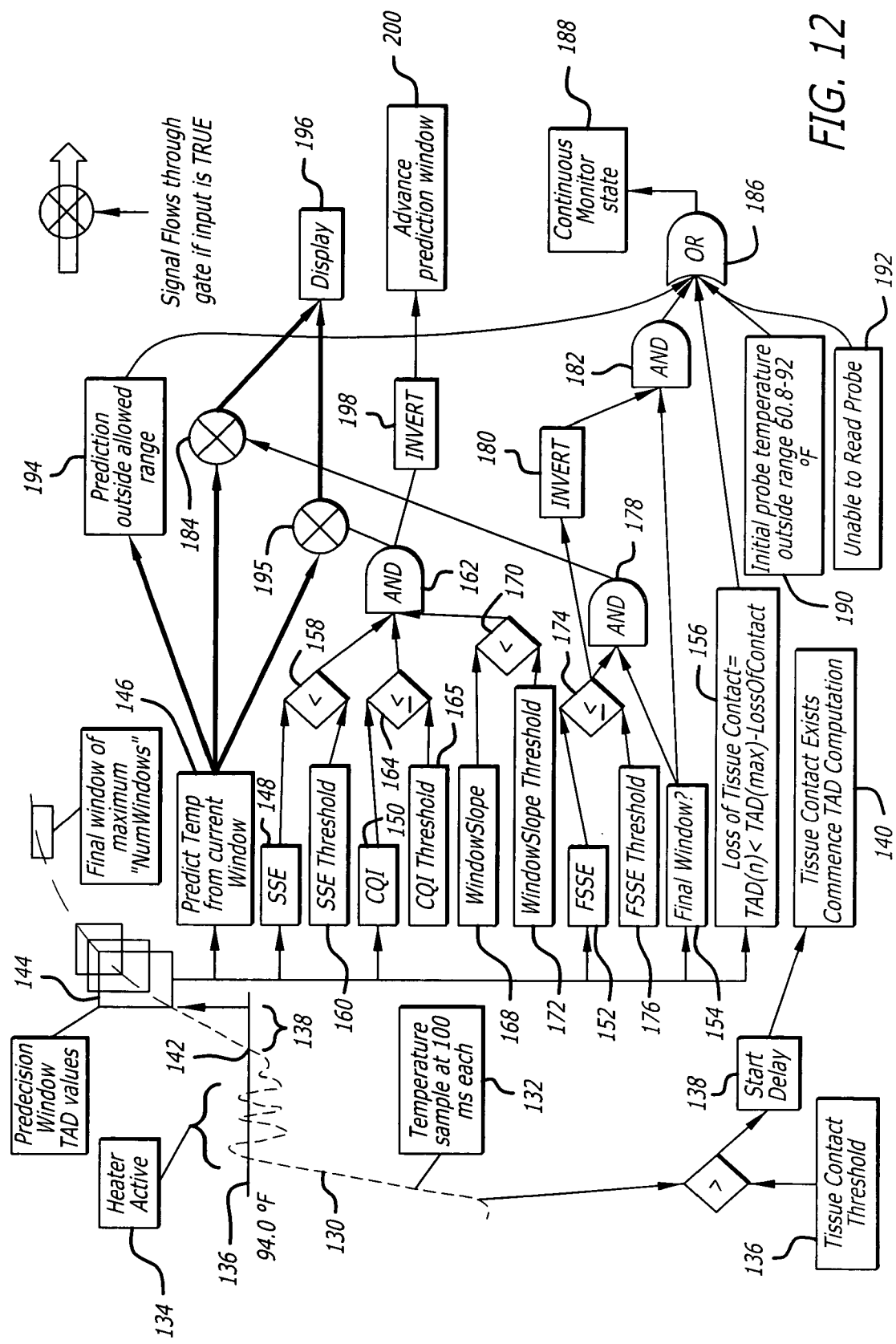
FIG. 12 is a data flow chart in accordance with aspects of a method in accordance with aspects of the present invention.

In order to mitigate the effects of noise sources, the algorithm computes multiple estimates from "time windows" each consisting of a fixed number of TAD samples each (see block diagram, FIG. 12. In order to determine whether the estimate from a particular window is suitable for prediction or whether the measurement window must be advanced (slid) to the next incoming TAD value, three metrics are computed.

1. The first qualification measure is the window Sum Square Error (SSE) (Equation 14). In the case where the final window permitted is reached, the SSE value of the final window is used to determine whether a prediction should be displayed or whether the instrument should make a transition to the Continuous Monitoring State when unable to make a reliable prediction.

$$SSE = \sum_{i=1}^{N} (TAD_i - \hat{T}_i)^2 \quad \text{(Eq. 14)}$$

for N TAD's.

Figure 1:
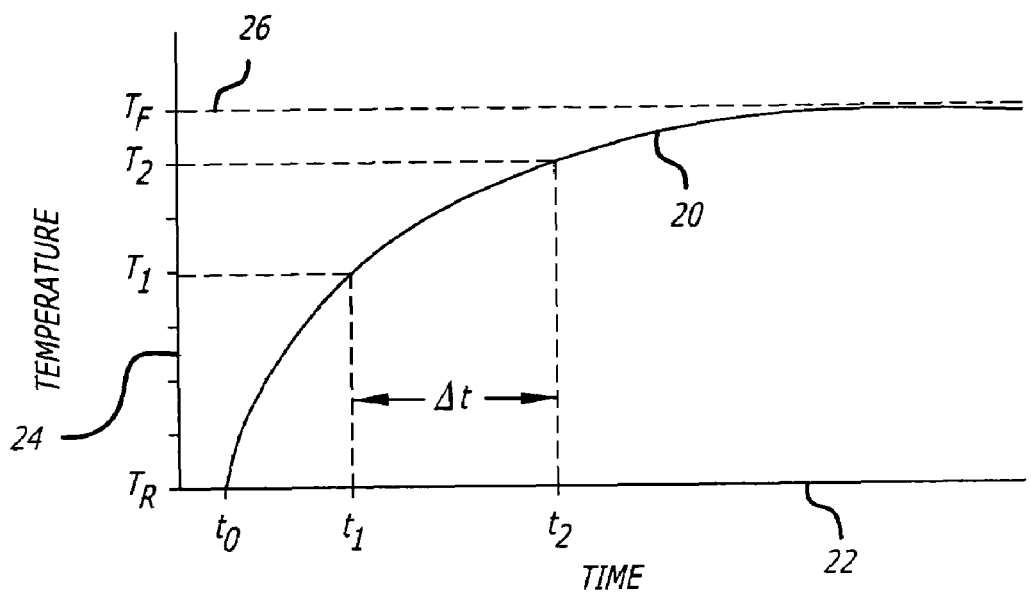
FIG. 1 is a graph of a typical asymptotic response curve of a thermistor sensor device showing the temperature equilibration of such a sensor mounted within a temperature probe that is in contact with a patient.
Figure 2:
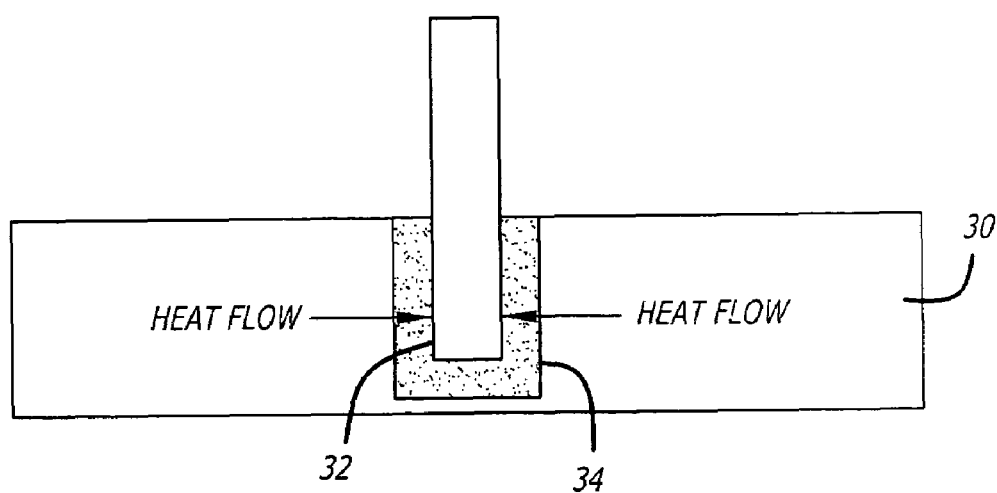
FIG. 2 is a view of a small object having a first temperature immersed in a large fluid bath where the fluid is at a second, higher temperature than the first temperature showing the heat flow between the two to achieve equilibration.
Figure 3:
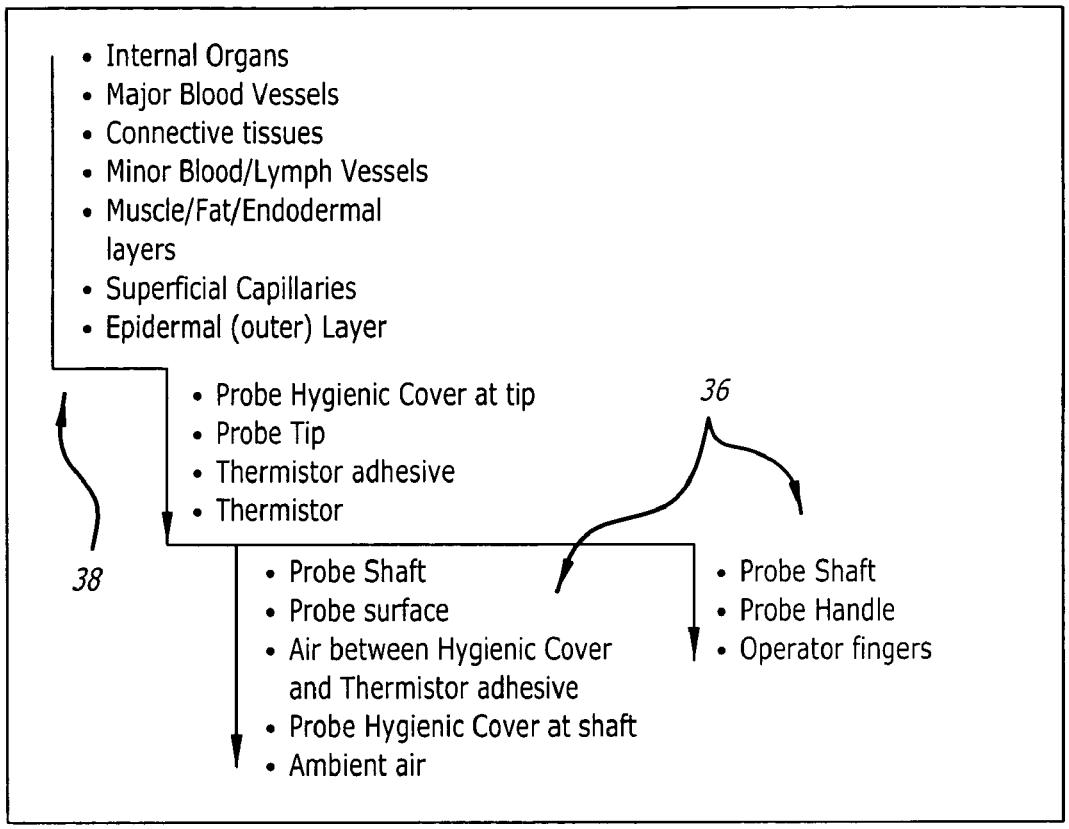
FIG. 3 is a heat flow diagram of the process of measuring the temperature of a patient, showing heat generated by the internal organs, spreading through the major blood vessels and other tissues, through the probe cover and other devices, finally arriving at the thermistor, but then flowing away from the thermistor to the probe shaft, through air, the handle, and through devices and things that conduct heat away from the thermistor, and even to the operator.

2. The second qualification measure is the "Curvature Quality Index" (CQI). Its purpose is to detect artifacts in the window TAD data that would cause the temperature curve to deviate from a normally concave downward shape (see FIG. 1). Beginning with the third TAD of a window, each three TAD values are evaluated to determine their "curvature". In one embodiment, the second point of a series of three must have a value that is equal to or higher than the average of the first and third points or the CQI will be considered to be unacceptable. If any of the triplet of TAD's in a window fail to meet the curvature criterion then that window is not usable for prediction and the algorithm must advance the window one step (one TAD).

$$CQI_w = \sum_{k=1}^{N-2} \text{ifPOSITIVE}\left(\frac{TAD_{k+w-1} + TAD_{k+w+1}}{2} - TAD_{k+w}\right) \quad \text{(Eq. 15)}$$

where:
w is the index of the estimation window running from 1 to NumWindows
N is the number of TAD's per window and the TAD index runs from 1 to NumWindows+N−1

Note that the "ifPOSITIVE" operator indicates that if the value inside the parenthesis to the right is positive, it will be added to the sum. If the value is negative, it is not added to the sum. The CQI value for each window must equal or less than CQIThreshold in order for the estimate from a given window to be used to produce an immediate displayed prediction.

3. The third qualification measure is the slope of the window (WindowSlope) which is simply computed as the difference between the first and the last TAD in each window. If the value exceeds the limit SlopeThreshold, then the next window must be selected or the final window evaluated.

$$\text{WindowSlope} = TAD(\text{NumTADs}-1) - TAD(0) \quad \text{(Eq. 16)}$$

where NumTADs is number of TAD samples in a window

WindowSlope has been found to be quite helpful in the case of a subject who has a very high temperature, such as 104° F. (40° C.). In many cases, the temperature data curve of such a patient has a very high slope initially and could lead the processor to predict a temperature that is much higher than the subject's actual temperature. In accordance with the WindowSlope feature, when the slope is too high, indicating a possible "hot" subject, the processor will wait for a subsequent window of data. Subsequent data may be closer to a point where the temperature data of the subject begins to be more asymptotic and a prediction would be accurate. In one embodiment, in the event that no window meets the criteria for immediate prediction an alternate opportunity is provided once the LastWindow is reached. The SSE of the final window is compared against a threshold FinalWindowSumSquareThreshold. If this criterion is met, then a prediction is computed for the final window.

Estimation Processing

To produce an estimate, an estimation window must be completed by acquiring and producing the needed TAD samples. Next the TAD samples are processed to determine the fit parameters A, B, and C as well as the qualification measures, SSE, CQI, and WindowSlope.

Figure 9:
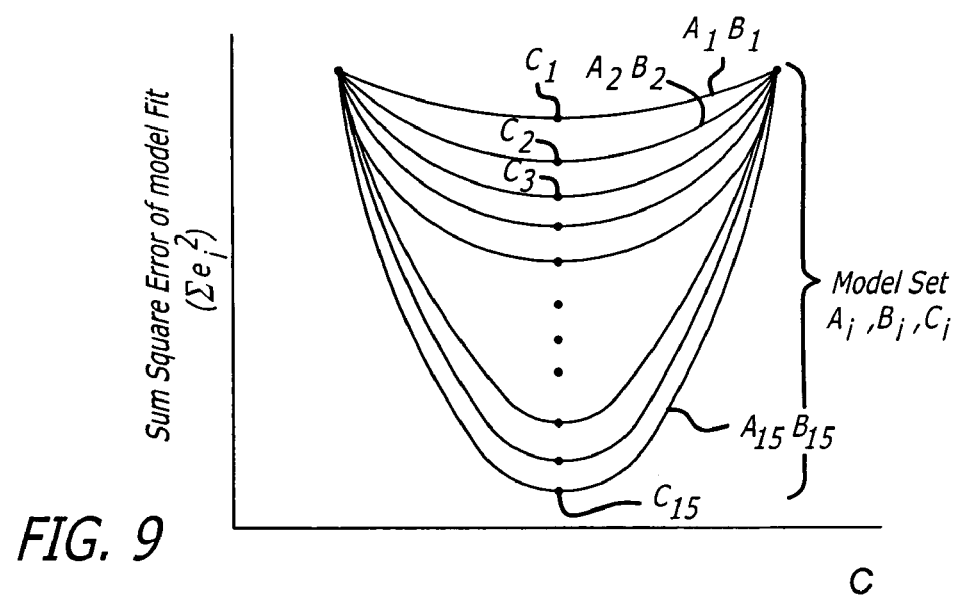
FIG. 9 is a set of model temperature curves formed by different sets of selected Ai, Bi, and Ci parameters to be used with temperature data curves of a subject to fit a model curve to the data curve and when fit within limits, to predict the temperature of the subject.

A and B are determined using least squares estimation methods (LSE), but due to the non-linear nature of Equation 9, C and E must be determined by computing the sum squared error for each value of C, E and finding the C, E values along with corresponding A and B values producing the minimum Sum Square Error ("SSE"). It has been found sufficient to choose C, E from a finite range of possible values for a particular body site. The mouth and rectum have sufficiently similar and relatively high thermal conductivity to use one range of C, E values. While the axilla, possessing lower average heat conductivity, uses a distinct and lower range of C, E values. In one embodiment in order to determine A and B, three fixed arrays of constants are constructed for each of the C values and E is set to a value of one and is not varied. FIG. 9 presents the determination of the A, B, and C parameters in the present embodiment. The processor selects each of fifteen C values with its associated A and B parameters and takes the sum squared error for each. The C value along with its associated A and B parameters with the lowest error is used in Equation 10 to compute the predicted temperature.

FIG. 9 and FIG. 10 present a technique in accordance with an embodiment of the invention in which the model temperature curve is precisely fit to the actual temperature measurement data points. In FIG. 9, various curves are shown, all of which are applied to the actual temperature measurement data points 126 shown in FIG. 10. In FIG. 10, it is shown that a model curve 128 having certain parameters $A_i$, $B_i$, and $C_i$ has been fit to the data points. The errors $e_1$ through $e_6$, that is, differences between the data points and the model curve, are determined, and the sum squared error is taken. In one embodiment, if the SSE of this model curve is the lowest, it is used as the model curve for the temperature data of this measurement. Any well known least squares estimation routine can be used, as is well known to those skilled in the art. In an alternate embodiment, the two values of C producing the minimum SSE can be determined. From these two values an intermediate value of C is determined for which the SSE is computed. If this SSE is less than both the initial two SSE values, then it is used or the process is repeated until the SSE either falls below an acceptable threshold or ceases to decrease.

Tissue Contact Detection, Start, and Restart of Prediction

The time limit of detection of Tissue Contact for purposes of determining total prediction time is defined as the time of the last raw temperature sample (100 ms) to exceed the TissueContact Threshold temperature prior to a prediction. This sample will be referred to as the TC sample.

The Start of Prediction sample (SOP) occurs following PredictStartDelay sample (raw samples). Note that if any sample following TC equals or falls below TissueContact-Threshold, then the TC value is reset, prediction is halted and reset and the prediction start delay restarts. Thus the index value of SOP is defined as below:

SOP=TC+PredictStartDelay    (Eq. 17)

Figure 11:
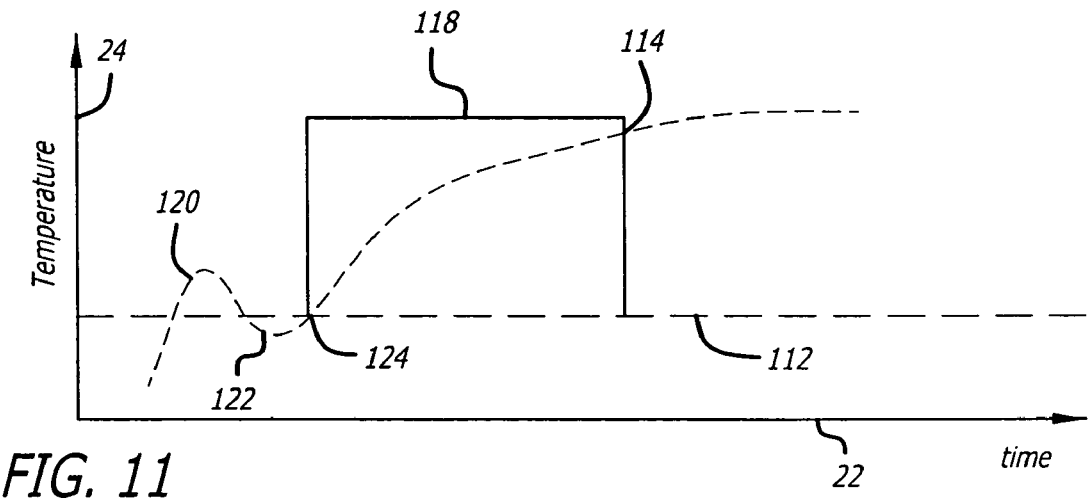
FIG. 11 is an enlarged part of the temperature graph of FIG. 8 showing the final tissue contact point used in the prediction, and showing the prediction start delay and the start of prediction sample.

In the example of FIGS. 8 and 11, the first TC 120 is reset due to raw temperature 122 falling below the TissueContactThreshold 112. Subsequently a final TC 124 is found with associated relative index=1. Following PredictStartDelay 118 of samples, the StartPrediction 114 sample occurs, this sample is the first sample of the first TAD.

Loss of Tissue Contact Detection

Tissue contact may be lost at some point prior to a prediction being completed. This condition is detected when a TAD sample occurs that is less than the maximum TAD value by a preset margin.

FIG. 12 provides a data flow diagram coupled to a diagram of a graph line 130 of the temperature response for a temperature sensor used in a predictive technique. Temperature samples 132 shown as dots in the graph line are taken each 100 milliseconds in this embodiment. During the interval 134, the heater brings the temperature of the sensor to a target preheat temperature typically about 1° F. (≈0.5° C.) below the tissue contact threshold 136, in this case 94° F. (34.4° C.). The graph line is shown in FIG. 11 traversing the tissue contact threshold seven times. Due to a start delay 138, TAD computation processing 140 does not occur until the seventh time 142 the tissue contact threshold is crossed.

The start delay operation avoids premature commencement of the prediction process by requiring that the sampled temperature must remain above the tissue-contact-threshold for at least an interval (typically 0.5 seconds) before prediction processing commences. Even when this condition is satisfied, should the sampled temperature fall below the tissue-contact-threshold, the prediction process is aborted and sampling resumes to determine when, or if the sampled temperature again exceeds the tissue-contact-threshold as discussed above. Should the sampled temperature not exceed the tissue-contact-threshold for one minute, the mode is automatically transitioned to the Continuous Monitoring State together with associated audible notification and changes to the display indicators.

Once sampled data exceeds the tissue-contact-threshold for the required time, the TAD values, shown as dashes, are computed in a first window 144 and in subsequent windows if a temperature prediction cannot be made from the first window. The functions of "predict temp from current window" 146, SSE 148, CQI 150, FSSE 152, final window 154, and loss of tissue contact 156 are all performed from the TAD values as was described above. Logic is shown in FIG. 12 for these functions.

Logical AND gate 162 is used to control whether the prediction from the current window is used and presented or whether the window must be advanced by one TAD value. Specifically the results of three comparisons must all be true in order for the output of 162 to be true causing the present prediction to be displayed. The three inputs are formed as follows. The SSE is compared 158 to a SSE Threshold 160, the CQI is compared 164 to a CQI threshold 166, and the window slope 168 is compared 170 to a windowslope threshold 172. The outputs of the three comparison operators 158, 164 and 170 are presented at the input of AND gate 162.

If the final window has been reached, a distinct set of rules are applied to determine whether the prediction of that window is displayed or transition to the Continuous Monitoring State occurs. Logical AND gate 178 is used to control transmission of the prediction produced by the final window to the user display via transmission gate 184. Specifically the results of two comparisons must both be true in order for the output of gate 178 to be true which in turn will permit transmission gate 184 to pass the prediction to the display 196. The two logical inputs are formed as follows. The FSSE 152 is tested by comparator 174 to an FSSE threshold 176 and the final window state 154 is assessed whether true or false, this logical signal is also sent to AND gate 178.

Several logical conditions may arise that cause transition of the instrument's operating state to the Continuous Monitoring State 188. The logical OR gate 186 when true causes transition to the Continuous Monitoring State. Its inputs include the output of AND gate 182, which in turn receives two logical signals, one from the final window logic 154, and the other from the inverted 180 output of comparator 174. The logic implements the following test " . . . if the FSSE is greater than the FSSE threshold AND the final window is currently being used for prediction, then transition to the continuous monitoring state."

Additional inputs to logical OR gate 186 include safety and reliability tests including checking for abnormal initial probe temperature 190 immediately following probe withdrawal from its well, inability of the heater control logic to attain adequate temperature rise 192 and determination that the prediction from the final window is outside a permitted range 194.

Also shown is a gate 195 for presenting the predicted temperature from the current window 146 on the display 196. However before this can be done, there must be an input from the AND gate 162 indicating that SSE, CQI, and WindowSlope are all acceptable. In another feature, the output of the AND gate 162 is provided to an inverter 198 which provides a signal to Advance the Prediction Window 200.

In accordance with the above, there has been provided a system and a method for accurately predicting the temperature of a subject. Approximations of the temperature data curve are not used. Instead an actual curve is fit to the temperature data curve to result in increased accuracy. A non-linear, multi-parameter model curve is fit to the temperature measurement data. The multiple parameters are selected in dependence on the particular temperature measurement data itself thus adapting the model curve to the particular temperature situation at hand and thereby making it very accurate. Safeguards are provided to avoid the use of misleading data, such as from heater effects, subjects having very high temperatures, and loss of tissue contact. The approach provided is capable of being conducted by processors having limited processing power yet is able to provide accurate predictions of the subject's temperature before equilibration occurs.

While several forms of the invention have been illustrated and described, it will also be apparent that various modifications can be made without departing from the spirit and scope of the invention. Accordingly, it is not intended that the invention be limited except by the appended claims.

What is claimed is:

1. A thermometer for determining the temperature of a subject, comprising:
a sensor that provides temperature signals in response to sensing the temperature of the subject, the temperature signals varying in time;
a display; and
a processor configured to:
monitor the temperature signals;
adapt a variable shape, nonlinear, multi-parameter model temperature curve to the monitored temperature signals, wherein the configuration of the processor in adapting the model temperature curve comprises:

$$T_{fit}(n \cdot \tau) = A + \frac{B}{1 + n \cdot \tau \cdot C^E}$$

where:
$T_{fit}(n \cdot \tau)$ is an estimate of the temperature at a particular time $t = n \cdot \tau$ (° F.);
n is an integer sample index initialized to 0 at the first sample meeting conditions for "Prediction Start";
$\tau$ is a number of seconds per sample (sec);
A is an "offset" parameter (° F. or ° C.);
B is a "span" or "range" parameter (° F. or ° C.);
C is a "curvature" or "rate of equilibration" parameter ($sec^{-1}$); and
E is a "time warp" factor (unit-less) that may be used to make a nonlinear modification of the curvature of the model curve to make it better fit the curve of the temperature data;
compare the model temperature curve to the monitored temperature signals;
if the differences between the model temperature curve and the monitored temperature signals do not exceed a threshold, predict the temperature of the subject based on the model curve; and
provide the predicted temperature to the display;
wherein the display displays the predicted temperature.

2. The thermometer of claim 1 wherein the processor is further configured to determine the differences between the model temperature curve and the monitored temperature signals by means of sum squared error and uses the sum squared error in selecting one or more of the parameters.

3. The thermometer of claim 2 wherein the processor uses the sum squared error in selecting the A and B parameters given the C and E parameters.

4. The thermometer of claim 1 wherein the processor is further configured to determine the differences between the model temperature curve and the monitored temperature signals by means of sum squared error and uses the sum squared error in selecting the values of all of the selectable parameters.

5. A thermometer for determining the temperature of a subject, comprising:
a sensor that provides temperature signals in response to sensing the temperature of the subject, the temperature signals varying in time;
a display; and
a processor configured to:
monitor the temperature signals;
adapt a variable shape, nonlinear, multi-parameter model temperature curve to the monitored temperature signals;
compare the model temperature curve to the monitored temperature signals;
if the differences between the model temperature curve and the monitored temperature signals do not exceed a threshold, predict the temperature of the subject based on the model curve;
compare characteristics of the monitored temperature data to integrity criteria and if any characteristic of the monitored temperature data does not satisfy the integrity criteria, the processor does not use the monitored temperature data to predict the temperature of the subject; and
provide the predicted temperature to the display;
wherein the display displays the predicted temperature.

6. The thermometer of claim 5 wherein one of the integrity criteria comprises a curvature quality of the monitored temperature data.

7. The thermometer of claim 6 wherein the curvature quality is determined by the existence of a section of a curve based on the actual temperature measurement data that is considered for use in estimation of temperature that is not concave downward.

8. The thermometer of claim 5 wherein one of the integrity criteria comprises a slope limit of the monitored temperature data.

9. The thermometer of claim 8 wherein the slope limit comprises a maximum slope limit.

10. A thermometer for determining the temperature of a subject, comprising:

a sensor that provides temperature signals in response to sensing the temperature of the subject, the temperature signals varying in time;
a display; and
a processor configured to:
monitor the temperature signals;
adapt a variable shape, nonlinear, multi-parameter model temperature curve to the monitored temperature signals;
compare the model temperature curve to the monitored temperature signals;
if the differences between the model temperature curve and the monitored temperature signals do not exceed a threshold, predict the temperature of the subject based on the model curve;
compare curvature quality of the monitored temperature signals to a quality threshold and if the curvature quality exceeds the quality threshold, the processor will not predict the temperature of the subject based on the data forming the basis for the curvature quality comparison; and
provide the predicted temperature to the display;
wherein the display displays the predicted temperature.

11. A thermometer for determining the temperature of a subject, comprising:
a sensor that provides temperature signals in response to sensing the temperature of the subject, the temperature signals varying in time;
a display; and
a processor configured to:
monitor the temperature signals;
adapt a variable shape, nonlinear, multi-parameter model temperature curve to the monitored temperature signals;
compare the model temperature curve to the monitored temperature signals;
if the differences between the model temperature curve and the monitored temperature signals do not exceed a threshold, predict the temperature of the subject based on the model curve;
compare a slope of the monitored temperature signals to a slope threshold and if the slope exceeds the slope threshold, the processor will not predict the temperature of the subject based on the data forming the basis for the slope comparison; and
provide the predicted temperature to the display;
wherein the display displays the predicted temperature.

12. A method for determining the temperature of a subject, comprising:
sensing the temperature of the subject;
providing temperature signals based on the sensing, the temperature signals varying in time;
monitoring the temperature signals;
adapting a variable shape, nonlinear, multi-parameter model temperature curve to the monitored temperature signals;
wherein adapting the model temperature curve comprises:

$$T_{fit}(n \cdot \tau) = A + \frac{B}{1 + n \cdot \tau \cdot C^E}$$

where:
$T_{fit}(n \cdot \tau)$ is an estimate of the temperature at a particular time $t = n \cdot \tau$ (° F.);

n is an integer sample index initialized to 0 at the first sample meeting conditions for "Prediction Start";
$\tau$ is a number of seconds per sample (sec);
A is an "offset" parameter (° F. or ° C.);
B is a "span" or "range" parameter (° F. or ° C.);
C is a "curvature" or "rate of equilibration" parameter ($sec^{-1}$); and
E is a "time warp" factor (unit-less) that may be used to make a nonlinear modification of the curvature of the model curve to make it better fit the curve of the temperature data;
comparing the model temperature curve to the monitored temperature signals;
if the differences between the model temperature curve and the monitored temperature signals do not exceed a threshold, predicting the temperature of the subject based on the model curve; and
displaying the predicted temperature.

13. The method of claim 12 wherein determining the differences between the model temperature curve and the monitored temperature signals comprises taking a sum squared error and using the sum squared error in selecting one or more of the parameters.

14. The method of claim 13 further comprising using the sum squared error in selecting the A and B parameters given the C and E parameters.

15. The method of claim 12 further comprising determining the differences between the model temperature curve and the monitored temperature signals by means of sum squared error and using the sum squared error in selecting the values of all of the selectable parameters.

16. A method for determining the temperature of a subject, comprising:
sensing the temperature of the subject;
providing temperature signals based on the sensing, the temperature signals varying in time;
monitoring the temperature signals;
adapting a variable shape, nonlinear, multi-parameter model temperature curve to the monitored temperature signals;
comparing the model temperature curve to the monitored temperature signals;
if the differences between the model temperature curve and the monitored temperature signals do not exceed a threshold, predicting the temperature of the subject based on the model curve;
comparing the nonlinear curve fitting to a predetermined integrity criterion and if the predicted temperature from the curve fitting does not meet the integrity criterion, excluding the monitored temperature data from a prediction of the subject's temperature; and
displaying the predicted temperature.

17. A method for determining the temperature of a subject, comprising:
sensing the temperature of the subject;
providing temperature signals based on the sensing, the temperature signals varying in time;
monitoring the temperature signals;
adapting a variable shape, nonlinear, multi-parameter model temperature curve to the monitored temperature signals;
comparing the model temperature curve to the monitored temperature signals;
if the differences between the model temperature curve and the monitored temperature signals do not exceed a threshold, predicting the temperature of the subject based on the model curve;

further comprising comparing characteristics of the monitored temperature data to integrity criteria and if any characteristic of the monitored temperature data does not satisfy the integrity criteria, excluding the monitored temperature data from prediction of the temperature of the subject; and displaying the predicted temperature.

18. The method of claim 17 wherein one of the integrity criteria comprises a curvature quality of the monitored temperature data.

19. The method of claim 18 wherein the curvature quality is determined by the existence of a section of a curve based on the actual temperature measurement data that is considered for use in estimation of temperature that is not concave downward.

20. The method of claim 17 wherein one of the integrity criteria comprises a slope limit of the monitored temperature data.

21. The method of claim 20 wherein the slope limit comprises a maximum slope limit.

22. A method for determining the temperature of a subject, comprising:

sensing the temperature of the subject;

providing temperature signals based on the sensing, the temperature signals varying in time;

monitoring the temperature signals;

adapting a variable shape, nonlinear, multi-parameter model temperature curve to the monitored temperature signals;

comparing the model temperature curve to the monitored temperature signals;

if the differences between the model temperature curve and the monitored temperature signals do not exceed a threshold, predicting the temperature of the subject based on the model curve;

comparing curvature quality of the monitored temperature signals to a quality threshold and if the curvature quality exceeds the quality threshold, not predicting the temperature of the subject based on the data forming the basis for the curvature quality comparison; and displaying the predicted temperature.

23. A method for determining the temperature of a subject, comprising:

sensing the temperature of the subject;

providing temperature signals based on the sensing, the temperature signals varying in time;

monitoring the temperature signals;

adapting a variable shape, nonlinear, multi-parameter model temperature curve to the monitored temperature signals;

comparing the model temperature curve to the monitored temperature signals;

if the differences between the model temperature curve and the monitored temperature signals do not exceed a threshold, predicting the temperature of the subject based on the model curve;

comparing a slope of the monitored temperature signals to a slope threshold and if the slope exceeds the slope threshold, not predicting the temperature of the subject based on the data forming the basis for the slope comparison; and displaying the predicted temperature.

24. A method for determining the temperature of a subject, comprising:

sensing the temperature of the subject;

providing temperature signals based on the sensing, the temperature signals varying in time;

monitoring the temperature signals;

adapting a variable shape, nonlinear, multi-parameter model temperature curve to the monitored temperature signals, wherein adapting a variable shape, nonlinear, multi-parameter model temperature curve comprises selecting a curvature index as one of the multiple parameters for the nonlinear model;

comparing the model temperature curve to the monitored temperature signals;

if the differences between the model temperature curve and the monitored temperature signals do not exceed a threshold, predicting the temperature of the subject based on the model curve; and displaying the predicted temperature.

25. The method of claim 24 wherein the curvature index is constrained to a family of values appropriate to a measurement site.

* * * * *